United States Patent
Das et al.

(10) Patent No.: US 10,289,952 B2
(45) Date of Patent: *May 14, 2019

(54) SEMANTIC FRAME IDENTIFICATION WITH DISTRIBUTED WORD REPRESENTATIONS

(71) Applicant: Google LLC, Mountain View, CA (US)

(72) Inventors: Dipanjan Das, Jersey City, NJ (US); Kuzman Ganchev, Forest Hills, NY (US); Jason Weston, New York, NY (US); Karl Moritz Hermann, New York, NY (US)

(73) Assignee: Google LLC, Mountain View, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 15/008,794

(22) Filed: Jan. 28, 2016

(65) Prior Publication Data

US 2016/0239739 A1    Aug. 18, 2016

Related U.S. Application Data

(63) Continuation of application No. 14/271,997, filed on May 7, 2014, now Pat. No. 9,262,406.

(51) Int. Cl.
*G06F 17/28* (2006.01)
*G06N 5/02* (2006.01)
(Continued)

(52) U.S. Cl.
CPC ........... *G06N 5/027* (2013.01); *G06F 16/322* (2019.01); *G06F 16/328* (2019.01);
(Continued)

(58) Field of Classification Search
CPC combination set(s) only.
See application file for complete search history.

(56) References Cited

U.S. PATENT DOCUMENTS 9,262,406 B1 * 2/2016 Das .................. G06F 17/289
2015/0193428 A1 * 7/2015 Lim .................. G06F 17/2785
704/9

OTHER PUBLICATIONS

Baker, C. et al., "SemEval'07 Task 19: Frame Semantic Structure Extraction," Proceedings of the 4th International Workshop on Semantic Evaluations (SemEval-2007), Prague, Jun. 2007, Association for Computational Linguistics, pp. 99-104.
(Continued)

*Primary Examiner* — Vu B Hang
(74) *Attorney, Agent, or Firm* — Fish & Richardson P.C.

(57) ABSTRACT

A computer-implemented technique can include receiving, at a server, labeled training data including a plurality of groups of words, each group of words having a predicate word, each word having generic word embeddings. The technique can include extracting, at the server, the plurality of groups of words in a syntactic context of their predicate words. The technique can include concatenating, at the server, the generic word embeddings to create a high dimensional vector space representing features for each word. The technique can include obtaining, at the server, a model having a learned mapping from the high dimensional vector space to a low dimensional vector space and learned embeddings for each possible semantic frame in the low dimensional vector space. The technique can also include outputting, by the server, the model for storage, the model being configured to identify a specific semantic frame for an input.

10 Claims, 3 Drawing Sheets

(51) Int. Cl.
G06F 17/27 (2006.01)
G06F 16/31 (2019.01)
G06F 16/958 (2019.01)
G06F 17/22 (2006.01)

(52) U.S. Cl.
CPC ........ *G06F 16/958* (2019.01); *G06F 17/2264* (2013.01); *G06F 17/2785* (2013.01); *G06F 17/289* (2013.01); *G06F 17/274* (2013.01); *G06F 17/2755* (2013.01); *G06F 17/2872* (2013.01)

(56) References Cited

OTHER PUBLICATIONS

Carreras, X. et al., "Introduction to the CoNLL-2004 Shared Task: Semantic Role Labeling," 2004, 9 pages.

Carreras, X. et al., "Introduction to the CoNLL-2005 Shared Task: Semantic Role Labeling," 2005, 13 pages.

Das, D. et al., "Frame-Semantic Parsing," 2014 Association for Computational Linguistics, vol. 40, No. 1, pp. 9-56.

Das, D. et al., "Probabilistic Frame-Semantic Parsing," Human Language Technologies: The 2010 Annual Conference of the North American Chapter of the ACL, Los Angeles, California, Jun. 2010, Association for Computational Linguistics, pp. 948-956.

Hermann, K. et al., "Semantic Frame Identification with Distributed Word Representations," Proceedings of the 52th Annual Meeting of the Association for Computational Linguistics (2014), 11 pages.

Marquez, L. et al., "Semantic Role Labeling: An Introduction to the Special Issue," 2008 Association for Computational Linguistics, vol. 34, No. 2, pp. 145-159.

Palmer, M. et al., "The Proposition Bank: An Annotated Corpus of Semantic Roles," 2005 Association for Computational Linguistics, vol. 31, No. 1, pp. 71-105.

* cited by examiner

SEMANTIC FRAME IDENTIFICATION WITH DISTRIBUTED WORD REPRESENTATIONS

CROSS-REFERENCE TO RELATED APPLICATIONS

This application is a continuation of U.S. patent application Ser. No. 14/271,997, filed May 7, 2014. The disclosure of the above application is incorporated herein by reference in its entirety.

FIELD

The present disclosure generally relates to computational linguistics and, more particularly, to semantic frame identification with distributed word representations, also known as word embeddings.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Linguistic semantics focuses on the history of how words have been used in the past. Frame semantics is a theory of language meaning that relates linguistic utterances to word knowledge, such as event types and their participants. A semantic frame refers to a collection of facts or a coherent structure of related concepts that specify features (attributes, functions, interactions, etc.) that are typically associated with the specific word. One example semantic frame is the situation of a commercial transfer or transaction, which can involve a seller, a buyer, goods, and other related things.

SUMMARY

A computer-implemented technique is presented. The technique can include receiving, at a server having one or more processors, labeled training data including a plurality of groups of words, each group of words having a predicate word, each word having generic word embeddings. The technique can include extracting, at the server, the plurality of groups of words in a syntactic context of their predicate words. The technique can include concatenating, at the server, the generic word embeddings to create a high dimensional vector space representing features for each word. The technique can include obtaining, at the server, a model having a learned mapping from the high dimensional vector space to a low dimensional vector space and learned embeddings for each possible semantic frame in the low dimensional vector space. The technique can also include outputting, by the server, the model for storage, the model being configured to identify a specific semantic frame for an input.

In some embodiments, obtaining the model includes training, at the server, the model based on the learned mapping and the learned embeddings.

In other embodiments, the labeled training data includes (i) frames for verbs and (ii) possible semantic roles for each frame, and modifier roles in the labeled training data are shared across different frames.

In some embodiments, the learned mapping and the learned embeddings are determined by the server using a linear transformation algorithm.

In other embodiments, determining the learned mapping and the learned embeddings includes using the linear transformation algorithm with a weighted approximate-rank pairwise loss learned with a stochastic gradient.

In some embodiments, the features include at least one of (i) direct dependents from a dependency parse tree for a specific predicate word and (ii) dependency paths from the dependency parse tree for each word.

In other embodiments, the technique further includes learning, at the server, a technique for filling semantic roles for an identified semantic frame using a rule-based candidate argument extraction algorithm, wherein obtaining the model is further based on the learned technique, and wherein the model is further configured to identify specific roles for a specific semantic frame.

In some embodiments, the technique further includes: indexing, at the server, a plurality of web pages using the model to obtain an indexed plurality of web pages, and utilizing, by the server, the indexed plurality of web pages to provide search results in response to a search query.

In other embodiments, the technique further includes: receiving, at the server, speech input representing a question, converting, at the server, the speech input to a text, analyzing, at the server, the text using the model, and generating and outputting, by the server, an answer to the question based on the analyzing of the text using the model.

In some embodiments, the technique further includes: receiving, at the server, a text to be translated from a source language to a target language, the source language being a same language as a language associated with the model, analyzing, at the server, the text using the model, and generating and outputting, by the server, a translation of the text from the source language to the target language based on the analyzing of the text using the model.

A server having one or more processors configured to perform operations is also presented. The operations can include receiving labeled training data including a plurality of groups of words, each group of words having a predicate word, each word having generic word embeddings. The operations can include extracting the plurality of groups of words in a syntactic context of their predicate words. The operations can include concatenating the generic word embeddings to create a high dimensional vector space representing features for each word. The operations can include obtaining a model having a learned mapping from the high dimensional vector space to a low dimensional vector space and learned embeddings for each possible semantic frame in the low dimensional vector space. The operations can include outputting the model for storage, the model being configured to identify a specific semantic frame for an input.

In some embodiments, obtaining the model includes training the model based on the learned mapping and the learned embeddings.

In other embodiments, the labeled training data includes (i) frames for verbs and (ii) possible semantic roles for each frame, and modifier roles in the labeled training data are shared across different frames.

In some embodiments, the learned mapping and the learned embeddings are determined by the server using a linear transformation algorithm.

In other embodiments, determining the learned mapping and the learned embeddings includes using the linear transformation algorithm with a weighted approximate-rank pairwise loss learned with a stochastic gradient.

In some embodiments, the features include at least one of (i) direct dependents from a dependency parse tree for a specific predicate word and (ii) dependency paths from the dependency parse tree for each word.

In other embodiments, the operations further include learning a technique for filling semantic roles for an identified semantic frame using a rule-based candidate argument extraction algorithm, and obtaining the model is further based on the learned technique, and wherein the model is further configured to identify specific roles for a specific semantic frame.

In some embodiments, the operations further include: indexing a plurality of web pages using the model to obtain an indexed plurality of web pages, and utilizing the indexed plurality of web pages to provide search results in response to a search query.

In other embodiments, the operations further include: receiving speech input representing a question, converting the speech input to a text, analyzing the text using the model, and generating and outputting an answer to the question based on the analyzing of the text using the model.

In some embodiments, the operations further include: receiving a text to be translated from a source language to a target language, the source language being a same language as a language associated with the model, analyzing the text using the model, and generating and outputting a translation of the text from the source language to the target language based on the analyzing of the text using the model.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

One core challenge of computational linguistics is natural language parsing. Parsing refers to the determination of a parse tree (a grammatical analysis) of a specific sentence. Because the grammar for natural languages can be ambiguous, the specific sentence can have multiple possible parses. More specifically, each word may have different meanings depending on its context. One approach to word representation is to learn a distributed word representation (also known as a "word embedding"), which is not to be confused with a distributional word representation. Each dimension of a word embedding can represent a feature of the word. Word embeddings can be dense, low-dimensional, and real-valued representations of features for words. Because word embeddings can be dense (compact), they can be used to represent a large number of clusters in a low number of dimensions.

Accordingly, techniques are presented for semantic frame identification with word embeddings. These techniques can leverage automatic syntactic parses and a generic set of word embeddings. Given labeled training data annotated with frame-semantic parses, a model can be obtained that projects the set of word representations for the syntactic context around a predicate to a low dimensional representation. This low dimensional representation can represent a model used for semantic frame identification. Additionally, the model can be trained/modified and used for argument identification for an identified semantic frame, and thus the techniques can perform full frame-semantic parsing. Example uses for the model include indexing of web pages for improved web query/search performance, question analysis for improved answer performance, and text analysis for improved machine translation performance.

Figure 1A:
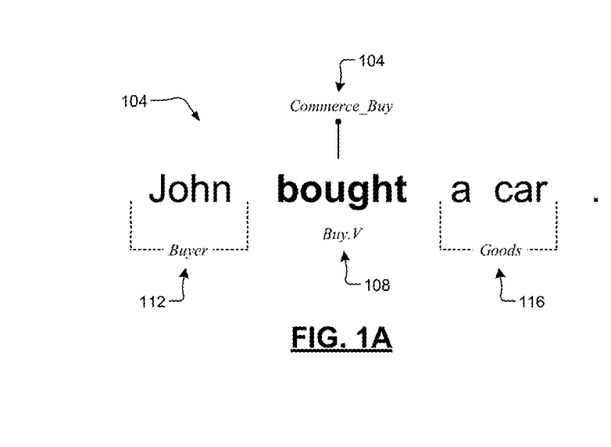
FIGS. 1A-1D are illustrations of example semantic frames and example semantic roles according to some implementations of the present disclosure.
Figure 1B:
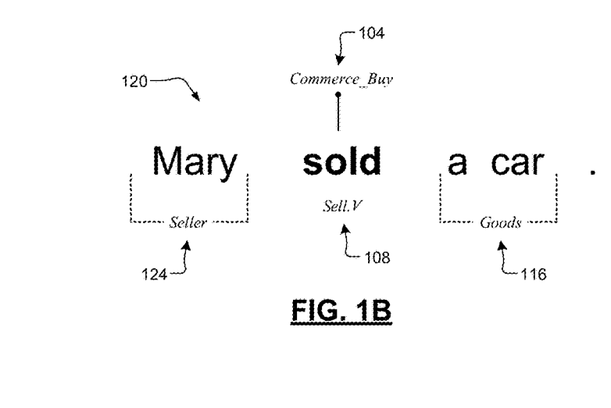

Referring now to FIGS. 1A-1B, frame-semantic parsing can include the resolution of a predicate sense into a frame and the analysis of the frame's arguments. A similar, related task is semantic role labeling. FIGS. 1A-1B illustrate example semantic frames and example semantic roles according to a first labeled (or annotated) lexical database. It will be appreciated that the terms "labeled lexical database" and "annotated lexical database" can refer to any suitable labeled/annotated training data. In one example implementation, the first labeled lexical database is the FrameNet lexical database. The first labeled lexical database can include information about words and phrases (represented as lemmas conjoined with a coarse part-of-speech (POS) tag) termed as lexical units, with a set of semantic frames that they could evoke. For each frame, there can be a list of associated frame elements (roles) that can also be distinguished as core or non-core. Sentences can be annotated using this universal frame inventory.

FIG. 1A illustrates a sentence 100: "John bought a car." A frame 104 (Commerce-Buy) can represent a frame that can be evoked by morphological variants of an example lexical unit 108 (Buy. V, where "V" indicates the word "buy" as a verb). The word "bought" is one of the morphological variants of this lexical unit 108. Core roles 112 and 116 (Buyer and Goods, respectively) represent example core roles for this frame 104. Specifically, core role 112 can correspond to "John" and core role 116 can correspond to "a car." FIG. 1B illustrates a similar sentence 120: "Mary sold a car." The frame 104 can also be evoked by morphological variants of another example lexical unit 120 (Sell. V, where "V" indicates the word "sell" as a verb). The word "sold" is one of the morphological variants of this lexical unit 120. Specifically, core role 124 (Seller) can represent another example core role for this frame 104.

Figure 1C:
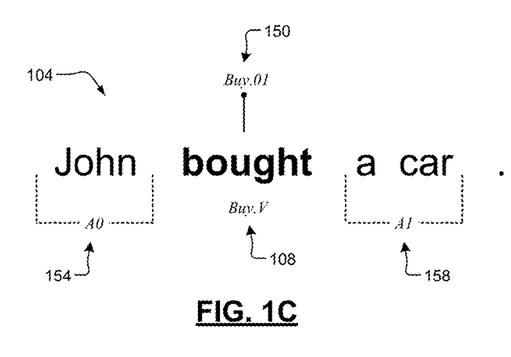
Figure 1D:
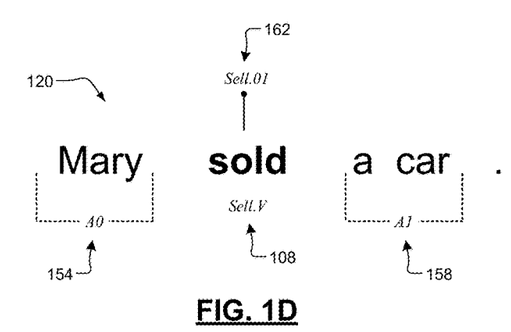

FIGS. 1C-1D, on the other hand, illustrate example semantic frames and example semantic roles according to a second labeled (or annotated) lexical database. In one example implementation, the second labeled lexical database is the PropBank lexical database. The second labeled lexical database can include information about verbs, in the form of sense frames, and the possible semantic roles that each frame could take. In this second labeled lexical database, modifier roles can be shared across verb frames, somewhat similar to the non-core roles discussed above. One key difference between the first and second labeled lexical databases, however, is that the second labeled lexical database uses a local frame inventory, where frames are predicate-specific. Moreover, role labels, although few in number, take specific meaning for each verb frame in the second labeled lexical database.

FIG. 1C illustrates the sentence 104: "John bought a car." A frame 150 (Buy.01) can represent a verb frame that can be evoked by morphological variants of lexical unit 108 (Buy.V). Again, the word "bought" is one of the morphological variants of this lexical unit 108. Generic core roles 154 and 158 (A0 and A1, respectively) represent example generic core roles for this frame 150. Specifically, generic core role 154 can correspond to "John" and generic core role 158 can correspond to "a car." FIG. 1D illustrates the sentence 120: "Mary sold a car." A frame 162 (Sell.01) can represent a verb frame that can be evoked by morphological variants of lexical unit 120 (Sell.V). Again, the word "sold" is one of the morphological variants of this lexical unit 120. Generic core roles 154 and 158 (A0 and A1, respectively) are shared by this frame 162. Specifically, generic core role 154 can correspond to "Mary" and generic core role 158 can again correspond to "a car."

The frame-semantic parsing problem can be modeled in two stages: (1) frame identification and (2) argument identification. The frame identification stage can correspond to a frame disambiguation stage for a sentence, and the argument identification stage ca correspond to a stage that finds the various arguments that fulfill the identified frame's semantic roles within the sentence. It will be appreciated that while the learning/generation of the model as discussed herein is described with respect to a particular sentence, in practice the model can be learned/generated using a large labeled training data including a plurality of groups of words, each group of words having a predicate word. Examples of a group of words include a sentence and a phrase. The model can receive word embeddings as input and learn to identify semantic frames. As discussed earlier herein, a word embedding can be a distributed representation of a meaning where each word is represented as a vector in $R^n$, where R represents the vector space and n represents its dimension. Such a representation can allow the model to share meaning between similar words, and can be used to capture semantic, syntactic, and morphological content. In this model, word embeddings can be used to represent the syntactic context of a particular predicate instance as a vector.

For example, in the sentence "He runs the company," the predicate "runs" has two syntactic dependents: a subject and a direct object. The sentence also has no prepositional phrases or clausal complements. The syntactic context of "runs" can be represented as a vector with blocks for all the possible dependents warranted by a syntactic parser. For example, the positions 0 . . . n in the vector may correspond to the subject dependents, n+1 . . . 2n may correspond to the clausal complement dependent, and so forth. Thus, the context can be a vector in $R^{kn}$ with the embedding of "He" at the subject position, the embedding of "company" in the direct object position, and zeros or null values everywhere else, where k is a number of possible syntactic context types. Given input vectors of this form as training data, a matrix can be learned that maps this high dimensional and sparse representation into a lower dimensional space. Simultaneously, this model can learn an embedding for all the possible labels, i.e., the frames in a given lexicon. At inference time, the predicate-context can be mapped to the low dimensional space, and a nearest frame label can be chosen as the classification.

To disambiguate the frame "runs" in context, the other words in the sentence "He runs the company" can be extracted in the syntactic context of the word "runs." After extracting the words, their word embeddings can be concatenated to create an initial vector space representation. This initial vector space representation, however, may be in a high dimensional space. Thus, a mapping from the initial vector space representation into a low dimensional space can be learned. An embedding for each possible frame label in the same low dimensional space can also be learned. For example, the goal of learning may be to make sure that the correct frame label is as close as possible to the mapped context, while competing frame labels are further away.

More specifically, let x represent the actual sentence with a marked predicate, along with the associated syntactic parse tree. An initial representation of the predicate context can be g(x). Initial word embeddings can be of dimension n. More particularly, g can be a function from a parsed sentence x to $R^{nk}$. For example, g can select some important positions relative to the predicate, and can reserve a block in its output space for the embedding of words found at that position. In some implementations, the function g can consider clausal complements and direct objects. In these cases, the function g: $X \rightarrow R^{2n}$ and for the example sentence it has zeros or null values in positions 0 . . . n and the embedding of the word "company" in positions n+1 . . . 2n, as shown below:

$$g(x)=[0, \ldots , 0, \text{embedding of "company"}].$$

The low dimensional space that is mapped to can be $R^m$ and the learned mapping can be M: $R^{nk} \rightarrow R^m$. The mapping M can be a linear transformation, and it can be learned using a linear transformation algorithm. In one example implementation, the linear transformation algorithm is the Wsabie algorithm. The linear transformation algorithm can learn an embedding for each frame label (hereinafter y). Thus, each frame can correspond to a point in $R^m$. If there are F possible frames, parameters can be stored in an F×m matrix, one m-dimensional point for each frame, which can be referred to as a linear mapping Y. A lexical unit (e.g., the lemma conjoined with a coarse POS tag) for the marked predicate can be represented as l. The frames associated with in the frame lexicon and the training corpora can be denoted as $F_l$, which can also be referred to as a confusion set. The linear transformation algorithm can perform gradient-based updates on an objective that tries to minimize the distance between M(g(x)) and the embedding of a correct label Y(y), while maintaining a large distance between M(g(x)) and other possible labels Y($\bar{y}$) in the confusion set $F_l$.

At disambiguation time, a simple dot product similarity can be used as a distance metric, meaning that the model can choose a label by computing the argmax$_y$s(x,y), where s(x,y)=M(g(x))·Y(y), where the argmax can iterate over the possible frames y∈$F_l$ if l was seen in the frame lexicon or the training data, or y∈F, if it was unseen. In some implementations, model learning can be performed using a margin ranking loss function, which is described in greater detail below. Because the linear transformation algorithm can learn a single mapping from g(x) to $R^m$, parameters can be shared between different words and different frames. For example, the sentence "He runs the company" may help the model disambiguate the sentence "He owns the company." Moreover, because g(x) relies upon word embeddings rather than word identities, information can be shared between words. For example, the sentence "He runs the company" may help the model learn about the sentence "She runs a corporation."

While g(x) may be any context feature function, two particular variants are discussed in greater detail herein. In both variants, the representation can be a block vector where each block corresponds to a syntactic position relative to the predicate, and each block's value can correspond to the embedding of the word at that position. The first variant can be direct dependents. More specifically, the positions of interest can be the labels of the direct dependents of the predicate, so k can be the number of labels that the dependency parser can produce. For example, if the label on an edge between "runs" and "He" is nsubj, the embedding of "He" may be put in the block corresponding to nsubj. If a particular label occurs multiple times, then the embeddings of the words below this particular label can be averaged.

Using only direct dependents, however, may miss some useful information. Topicalization, for example, can place discriminating information further from the predicate. For example, the sentence "It was the company that he runs" is an alternative of the sentence "He runs the company." In the sentence "It was the company that he runs," however, the word "company" may dominate the predicate "runs." Similarly, predicates in embedded clauses may have a distant agent which cannot be captured using direct dependents. For example, the sentence "The athlete prepared himself for three months to run the marathon" is an alternative of the sentence "The athlete ran the marathon." In the sentence "The athlete prepared himself for three months to run the marathon," however, for the predicate "run," the agent "The athlete" is not a direct dependent, but is connected via a longer dependency path.

Dependency paths, therefore, are the second variant of the context function g(x). The training data for a given task can be scanned for the dependency paths that connected known predicates to known semantic arguments. This set of dependency paths can be deemed as possible positions in the initial vector space representation. In addition, similar to the direct dependents context function, all dependency labels (e.g., paths of length l) can be added to the context set. Thus, for this context function, the block cardinality k can be the sum of the number of scanned known dependency paths and the number of dependency labels. Given a predicate in its sentential context, only those context words that appear in positions warranted by this set can be extracted.

The objective function can be modeled using a weighted approximate-rank pairwise loss, which may be learned with stochastic gradient descent. The mapping from g(x) to the low dimensional space $R^m$ can be the linear transformation, and thus the model parameters to be learned can be the matrix $M \in R^{kn \times m}$ as well as the embedding of each possible frame label, which can be represented as another matrix $Y \in R^{F \times m}$ where there are F frames in total. The training objective function can minimize:

$$\sum_x \sum_{\bar{y}} L(\text{rank}_y(x)) \max(0, \gamma + s(x, y) - s(x, \bar{y}), \quad (1)$$

where x and y represent training inputs and their corresponding correct frames, $\bar{y}$ represents negative frames, and $\gamma$ represents a margin. Here, $\text{rank}_y(x)$ represents the rank of the positive frame y relative for all the negative frames:

$$\text{rank}_y(x) = \sum_{\bar{y}} I(s(x, y) \le \gamma + s(x, \bar{y})), \quad (2)$$

and $L(\eta)$ converts the rank to a weight. Choosing $L(\eta)=C(\eta)$ for any positive constant C optimizes the mean rank, whereas a weighting such as $L(\eta)=\Sigma_{n=1}^{\eta} 1/i$ can optimize the top of the ranked list.

To train such an objective, a stochastic gradient can be employed. For example, for speed, the computation of $\text{rank}_y(x)$ can be replaced with a sampled approximation: sample N items $\bar{y}$ until a violation is found, e.g., $\max(0, \gamma + s(x,\bar{y})-s(x,y))>0$, and then approximate the rank with $(F-1)/N$. Various values for the stochastic learning rate, the margin $\gamma$, and/or dimensionality m can be selected. An alternative approach may learn only the matrix M, and then use a k-nearest neighbor classifier in $R^m$. One advantage of learning an embedding for the frame labels is that at inference time, only the set of labels for classification can be considered, rather than all training examples. Additionally, since a frame lexicon can be used that gives all possible frames for a given predicate, only a handful of candidate labels can be considered. If more or all candidates were considered, the process may be very slow.

Given the sentence x with a marked predicate, an argument identification model can assume that the predicate frame y has been disambiguated. From a frame lexicon, a set of semantic roles $R_y$ associated with y can be identified. This set can also contain a null role $r_\phi$. From the sentence x, a rule-based candidate argument extraction algorithm can extract a set of spans A that may potentially server as overt arguments $A_y$ for y. Training data in the form of $\langle\langle x^{(i)}, y^{(i)}, M^{(i)} \rangle\rangle_{i=1}^{N}$, where:

$$M=\{(r,a): r \in R_y, a \in A \cup A_y\} \quad (3),$$

can represent a set of tuples that associates each role r in $R_y$ with a span a according to the known dependency path data. This mapping may associate spans with the null role $r_\phi$ as well. The following log-likelihood can be optimized to train the model:

$$\max_\theta \sum_{i=1}^{N} \sum_{j=1}^{|M^{(i)}|} \log p_\theta((r, a)_j \mid x, y, R_y) - C\|\theta\|_2^2, \text{ where} \quad (4)$$

$$p_\theta((r, a)_j \mid x, y, R_y) = \frac{\exp\theta \cdot h(r, a, y, x)}{\sum_{\bar{r} \in R_y} \exp\theta \cdot h(\bar{r}, a, y, x)}. \quad (5)$$

Above, $\theta$ represents the model parameters, a represents candidate arguments and h represents a feature function that uses a set of argument identification features.

In one example implementation, the set of argument identification features used by the feature function h include:
Starting word of a;
POS of the starting word of a;
Ending word of a;
POS of the ending word of a;
Head word of a (hereinafter "the head");
POS of the head word;
Bag of words in a;
Bag of POS tags in a;
A bias feature;
Voice of the predicate use;
Word cluster of the head;
Word cluster of the head conjoined with word cluster of the predicate;
Dependency path between the head and the predicate;
The set of dependency labels of the predicate's children;
Dependency path conjoined with the POS tag of the head;

Dependency path conjoined with the word cluster of the head;

Position of a with respect to the predicate (before, after, overlap, or identical);

Whether the subject of the predicate is missing (missingsubj);

missingsubj, conjoined with the dependency path; and missingsubj, conjoined with the dependency path from the verb dominating the predicate to the head.

Although this learning mechanism uses a local log-linear model, at inference time, hard structural constraints can be applied to satisfy certain global requirements in the argument output. From the trained model parameters θ, a positive real-valued score can be calculated for every role and span tuple as $\Phi(r,a)=\theta \cdot h(r,a,y,x)$. For every candidate argument $a \in A$ and role $r \in R_y$, this score can be computed under the model, and a global integer linear program (ILP) can be formulated under some constraints. The solution to the global ILP can be treated as the final output of the method. Any suitable global ILP solver may be utilized to solve the global ILP and obtain the final output.

Figure 2:
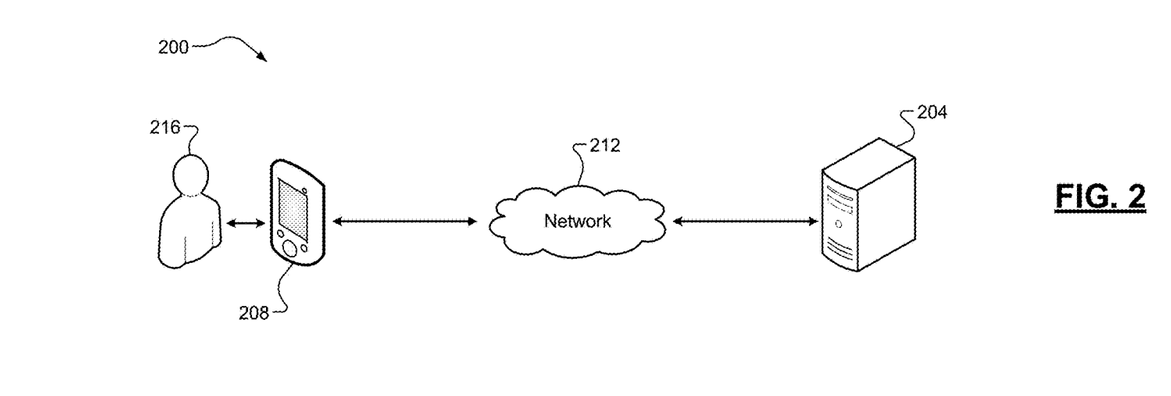
FIG. 2 is a diagram of a computing network including an example server according to some implementations of the present disclosure.

Referring now to FIG. 2, a computing network 200 having an example server 104 is illustrated. It should be appreciated that the term "server" as used herein can refer to any suitable computing device, as well as both a single hardware server and a plurality of hardware servers operating in a parallel or distributed architecture. The server 204 can communicate with a computing device 208 via a network 212. Examples of the computing device 208 include a desktop computer, a laptop computer, a tablet computer, a mobile phone, and wearable technology such as a smartwatch or eyewear incorporating a computing device. The network 212 can include a local area network (LAN), a wide area network (WAN), e.g., the Internet, or a combination thereof. A user 216 can operate the computing device 208.

The server 204 can implement at least a portion of the techniques of the present disclosure. The server 204 can generate or train a model using the semantic frame identification techniques with word embedding discussed herein. The server 204 can also utilize the model to perform tasks in various scenarios, at least some of which are described in greater detail below. It should be appreciated, however, that the model can be utilized for any suitable tasks relating to computational linguistics and, more particularly, to any suitable tasks involving natural language parsing.

In one scenario, the server 204 can index a plurality of web pages using the model to obtain a plurality of indexed web pages. After obtaining the plurality of indexed web pages using the model, the server 204 can then utilize the plurality of indexed web pages to provide search results in response to a search query. For example, the search query may be input by the user 216 to the computing device 208, and the search results may be output to the user 216 at the computing device 208.

In another scenario, the server 204 can receive speech input representing a question and the server 204 can convert the speech input to a text. Alternatively, the speech-to-text conversion may be performed elsewhere and the text can be received by the server 204. The server 204 can analyze the text using the model and generate an answer to the question based on the analyzing of the text using the model. For example, the question may be input by the user 216 at the computing device, and the answer (speech and/or text) may be output to the user 216 at the computing device 208.

In yet another scenario, the server 204 can receive a text to be translated from a source language to a target language, the source language being a same language as a language associated with the model. The server 204 can then analyze the text using the model, and generate a translation of the text from the source language to the target language based on the analyzing of the text using the model. For example, the text may be input by the user 216 at the computing device 208 and the translated text may be output to the user 216 at the computing device 208.

Figure 3:
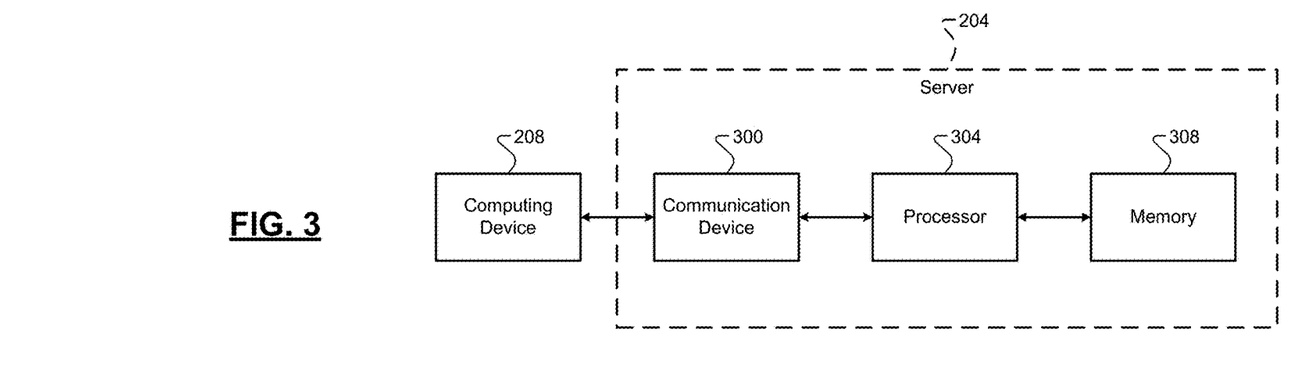
FIG. 3 is a functional block diagram of the example server of FIG. 1.

Referring now to FIG. 3, a functional block diagram of the example server 204 is illustrated. The server 204 can include a communication device 300, a processor 304, and a memory 308. The communication device 300 can include any suitable components (a transceiver) configured to communicate with other devices via the network 212. The processor 304 can control operation of the server 204 and can implement at least a portion of the techniques of the present disclosure as discussed herein. It should be appreciated that the term "processor" as used herein can refer to both a single server and a plurality of servers operating in a parallel or distributed architecture. The memory 208 can be any suitable storage medium (flash, hard disk, etc.) configured to store information at the server 204. For example only, the memory 308 may store the first and/or second labeled lexical databases discussed herein.

Figure 4:
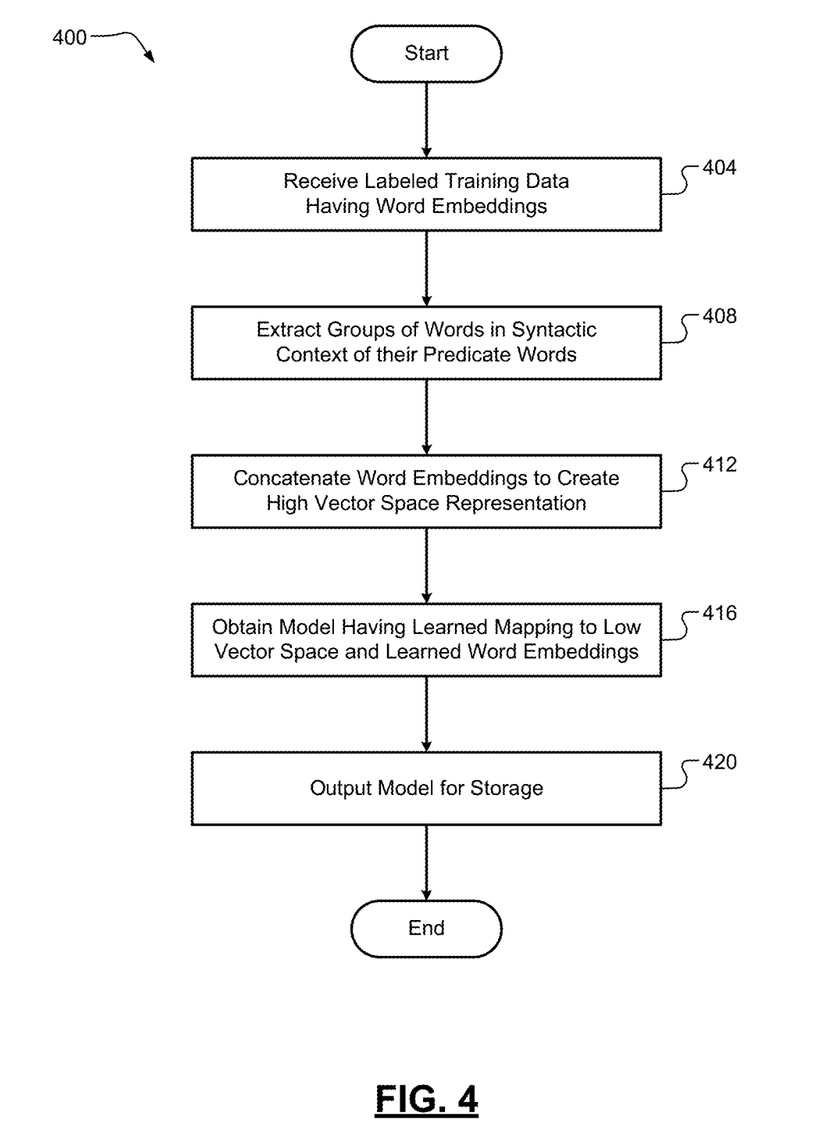
FIG. 4 is a flow diagram of an example technique for semantic frame identification with word embeddings according to some implementations of the present disclosure.

Referring now to FIG. 4, a technique 400 for semantic frame identification with word embeddings is illustrated. At 404, the server 204 can receive labeled training data including a plurality of groups of words, each group of words having a predicate word, and each word having generic word embeddings. For example, the labeled training data may be one of the first and second labeled lexical databases, which may be stored at the memory 208 or accessed at another device. At 408, the server 204 can extract the plurality of groups of words in a syntactic context of their predicate words. At 412, the server 204 can concatenate the generic word embeddings to create a high dimensional vector space representing features for each word. At 416, the server 204 can obtain a model having a learned mapping from the high dimensional vector space to a low dimensional vector space and learned embeddings for each possible semantic frame in the low dimensional vector space. At 420, the server 204 can output the model for storage, e.g., at the memory 308. The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, by a server computing system and from a client computing device, an input;
   obtaining, by the server computing system, one or more word embeddings;

utilizing, by the server computing system, the one or more word embeddings to identify a semantic frame for the input;

generating a response to the input based on the identified semantic frame for the input; and outputting, by the server computing system and to the client computing device, the response to the input generated based on the identified semantic frame for the input, wherein the one or more word embeddings are learned for each possible semantic frame in a first vector space, the first vector space having been obtained using a learned mapping from a second vector space having a higher dimensionality, the second vector space representing a concatenation of generic word embeddings for one or more groups of words from labeled training data.

2. The computer-implemented method of claim 1, wherein the input is a question received from the client computing device, wherein generating the response to the input based on the identified semantic frame for the input comprises utilizing, by the server computing system, the identified semantic frame to obtain an answer to the question; and wherein outputting the response to the input generated based on the identified semantic frame for the input comprises outputting, by the server computing system and to the client computing device, the answer to the question.

3. The computer-implemented method of claim 1, wherein the input is a search query received from the client computing device, wherein generating the response to the input based on the identified semantic frame for the input comprises:

indexing, by the server computing system, a plurality of web pages using the model to obtain an indexed plurality of web pages each having at least one identified semantic frame associated therewith;

obtaining, by the server computing system, search results for the search query by comparing the identified semantic frames for the indexed plurality of web pages to the identified semantic frame for the search query; and wherein outputting the response to the input generated based on the identified semantic frame for the input comprises outputting, by the server computing system and to the client computing device, the search results.

4. A computer-implemented method, comprising:

receiving, by a computing system, an input for a model;

generating, by a computing system, a request for one or more first word embeddings to be used by the model;

transmitting, from the computing system and to a server computing system, a request for the one or more first word embeddings, wherein receipt of the request causes the server computing system to obtain the one or more first word embeddings from second word embeddings;

receiving, by the computing system, the one or more first word embeddings;

utilizing, by the computing system, the one or more first word embeddings in the model to generate a response to the input; and providing, on the computing system and to a user, the response that was generated to the input, wherein second word embeddings are learned for each possible semantic frame in a first vector space, the first vector space having been obtained using a learned mapping from a second vector space having a higher dimensionality, the second vector space representing a concatenation of generic word embeddings for one or more groups of words from labeled training data.

5. The computer-implemented method of claim 4, wherein the input is a plurality of words, the model includes a semantic frame identification model, and the response is generated based on an identified semantic frame for the input.

6. The computer-implemented method of claim 5, the model further includes an argument identification model that utilizes the identified semantic frame for the input, and the response is generated based on identified arguments of the input.

7. The computer-implemented method of claim 4, wherein:

the input is a question, the model is a question-answer model, and the response is an answer to the question; or the input is a search query, the model is a web page indexing model, and the response is search results for the search query.

8. A computer-implemented method comprising:

receiving, by a computing system, an input;

identifying, by the computing system, a semantic frame of the input utilizing the set of learned word embeddings, comprising:

obtaining labeled training data including a plurality of groups of words, each group of words having a predicate word and each word having generic word embeddings; and obtaining the set of learned word embeddings including one or more learned word embeddings for each possible semantic frame in a first vector space, the first vector space having been obtained using a learned mapping from a second vector space having a higher dimensionality, the second vector space representing a concatenation of the generic word embeddings; and generating a response to the input based on the identified semantic frame for the input; and outputting, from the computing system, the response to the input generated based on the identified semantic frame.

9. The method of claim 8, wherein the input is a question, wherein generating the response to the input based on the identified semantic frame for the input comprises utilizing, by the computing system, the identified semantic frame to obtain an answer to the question; and wherein outputting the response to the input generated based on the identified semantic frame comprises outputting, by the computing system, the answer to the question.

10. The method of claim 8, wherein the input is a search query, wherein generating the response to the input based on the identified semantic frame for the input comprises:

indexing, by the computing system, a plurality of web pages using the model to obtain an indexed plurality of web pages each having at least one identified semantic frame associated therewith;

obtaining, by the computing system, search results for the search query by comparing the identified semantic frames for the indexed plurality of web pages to the identified semantic frame for the search query; and wherein outputting the response to the input generated based on the identified semantic frame comprises outputting, by the computing system, the search results.

* * * * *